Nov. 26, 1963   J. M. SCHMIT ETAL   3,111,799
METHOD OF HARVESTING WILD RICE
Filed Feb. 1, 1961
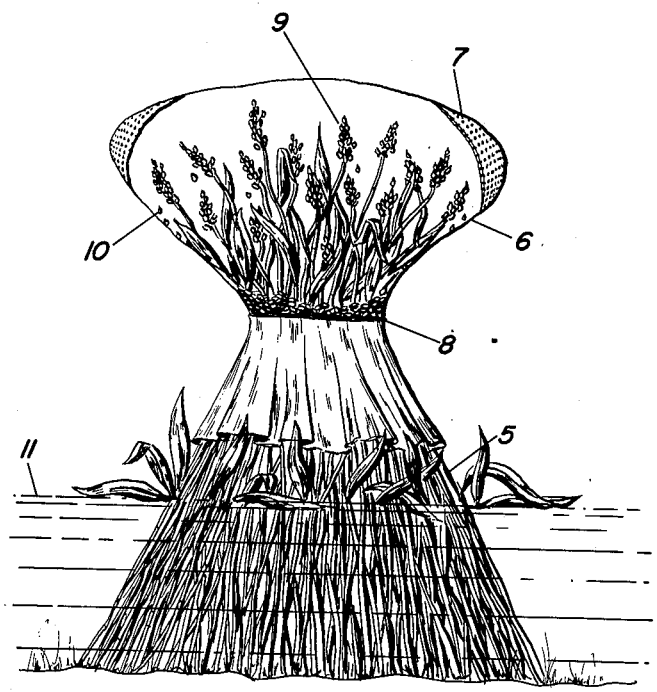
INVENTOR.
JUSTIN M. SCHMIT
HAROLD L. ANDREWS
BY Everett J. Schroeder 3,111,799
METHOD OF HARVESTING WILD RICE
Justin M. Schmit, Duluth, and Harold L. Andrews, Zim, Minn., assignors to The Chun King Corporation, Duluth, Minn., a corporation of Minnesota
Filed Feb. 1, 1961, Ser. No. 86,446
9 Claims. (Cl. 56—1)

This invention relates to wild rice and the harvesting thereof. More particularly, it relates to the methods utilized in harvesting wild rice.

Wild rice is conventionally harvested in a very inefficient manner in that the harvesters work their way through the ripened wild rice beds in a canoe or boat and bend the heads or stalks of wild rice over the boat and beat the same with a stick or other object to cause the ripened kernels or fruit to loosen or shatter and fall into the bottom of the boat from whence it is salvaged. This method of harvest yields only about ten percent of the total yield produced by the stalks because the wild rice ripens progressively upwardly from the head and hence much ripens, shatters, and is lost prior to the actual harvesting operation. Much is lost by the jarring of the stalks as the harvester's boat is moved into position and while the heads and stalks are being moved into position over the boat and much ripens subsequent to the harvesting operation. Since wild rice ripens over an extended period it is simply not feasible to harvest at an optimum time for all kernels of the individual heads and hence the total harvest is only a small fraction of the total yield available if all or even a major portion of the ripened fruit could be salvaged. Our invention is directed toward overcoming these inadequacies in the current and accepted methods of harvesting.

It is a general object of our invention to provide a novel and improved method of harvesting wild rice.

A more specific object is to provide a novel and improved method of harvesting wild rice which is both simple and inexpensive to practice.

A still more specific object is to provide a novel and improved method of harvesting wild rice which will substantially increase the yield of the harvest and is capable of being practiced with unskilled labor.

Another object is to provide a novel and improved method of harvesting wild rice which will substantially increase the harvest production and at the same time reduce the cost thereof substantially per unit of weight of the harvested product.

Another object is to provide a novel and improved method of harvesting wild rice which can be practiced economically in much greater amounts and in an economical manner whereby the ultimate cost to the consumer may be reduced.

Another object is to provide a novel and improved method of harvesting wild rice which is highly effective in substantially increasing the harvesting yield by preventing the excess loss experienced through the use of methods heretofore known, accepted, and practiced.

Another object is to provide a novel and improved method of harvesting wild rice which provides for collecting the ripened fruit in a novel and highly improved manner through the use of simple and inexpensive material and unskilled labor, and without damage to the ultimate product.

These and other objects and advantages of our invention will more fully appear from the following description, made in connection with the accompanying drawing wherein like reference characters refer to the same or similar parts throughout the view, and in which:

The FIGURE of the drawing is a side elevational view of a plurality of wild rice stalks, illustrating the manner in which we practice our invention.

In practicing our invention, we watch the wild rice as it develops and preferably wait till the heads of wild rice are fully developed but still immature. In other words, it is preferable for the individual kernels of the heads to be filled but still green before we commence to practice the invention. We find that we have about a two week period throughout which we can practice the method without sacrificing too much in the way of loss. In this connection, it will be realized that wild rice ripens gradually in stages with the uppermost heads and the upper portions thereof ripening earlier than the lower heads and the lower portions thereof. In practice we commence practicing the method while there are still some of the wild rice plants in flower and we continue to initiate the practice of the method until we find that an excess of the grain has already ripened so that it is no longer economically feasible to continue. These statements, of course, pertain to a situation where there is a vastly greater amount of wild rice growing than can be handled by the force practicing the invention. Ideally, however, if the method can be initiated at the time when the heads of wild rice are completely filled but still in an unripened stage, that is the optimum time for initiating the practice of the invention.

In practicing the invention, we select bags which are preferably formed of polyethylene, the walls of which have a thickness of approximately two millimeters. We find that the bags can preferably have dimensions of approximately 18 inches in width and 36 inches in length. The bottom portions of these bags have one-eighth inch holes punched therein on one inch centers to allow for air movement and drying within the bag. In practice we draw together a plurality of wild rice stalks from a selected area and invert the bag and apply the same over the upper portions of the gathered wild rice stalks, pulling the bag downwardly until the perforated portions thereof surround the immature and unripened heads of the wild rice stalks. We find that we can draw together the wild rice from approximately 10–12 square feet in this manner and apply a bag of the above dimensions thereto. The gathered rice stalks and the lower portions of the inverted bag are pulled together and tied tightly enough to prevent the bag from blowing off but loosely enough to prevent excessive crushing of the stems for the latter would damage the yield of the ripened rice eventually. The diameter of the tied area of the bag varies but normally is between 3–6 inches, depending upon the thickness of the stand of the wild rice stalks.

The drawing illustrates how the stalks 5 of wild rice are gathered together and the bag 6 is thrown over the upper portions thereof. The bottom of the bag is provided with perforations 7 as shown in order to permit the air to pass freely therethrough. The lower portions of the bag are secured by a cord 8 so that the stalks 5 which have been drawn together will in effect function as a porous plug or stopper for the bag 6. The heads 9 are permitted to gradually ripen while contained within the bag 6 and the ripened fruit 10 will fall, as illustrated, once they have become completely ripened and shatter from the head 9. Thus the ripened fruit 10 will collect in the lower portions of the bag directly above the cord 8 and will be retained within the bag by the stalks 5 which are secured therewithin.

After the heads 9 have completely ripened and the fruit 10 thereof has shattered from the head and fallen, the harvest may be completed. This is accomplished by cutting off the stalks 5 at an elevation immediately below the lower portions of the bag 6 such as along the broken line indicated by the numeral 11. It will be noted that the ripened fruit will still be retained within the bag 6. Thereafter the bag is deposited upon a canvas or in a cleaning device (not shown) and the cord 8 is severed, thereby permitting the ripened fruit 10 to be salvaged and collected. The severed portions of the stalks 5 can be easily separated from the collected ripened fruit 10 in any one of a number of ways well known in the art. For example, the bulkier portions can be removed manually while the remaining fruit and chaff and other refuse can be separated by passing the same through fanning mill of the type which is conventionally used to separate weed seeds and the like from desirable grain.

We have found that when wild rice is harvested in the manner described above through the use of our method, a very substantial increase in the harvest yield is obtained. Our method has the advantage of being able to be practiced through the use of unskilled labor and inexpensive and simple materials. The biggest advantage, of course, is the greatly increased harvest yield which is obtained for it is now possible through the practice of our method to successfully harvest the major portion of the ripened fruit in contrast to previously accepted methods whereunder only approximately 10 percent of the ripened fruit is salvaged.

It will, of course, be understood that various changes may be made in the form, details, arrangement and proportions of the parts without departing from the scope of our invention which consists of the matter shown and described herein and set forth in the appended claims.

What is claimed is:

1. The method of harvesting wild rice consisting in, enclosing the upper portions of a plurality of wild rice stalks having fruit-bearing heads within a substantially closed air-permeable container, permitting said heads to remain within said container until ripened and much of the fruit thereof is separated from their respective stalks, and collecting said ripened fruit from the interior of said container whereby the percentage of harvest is substantially increased.

2. The method of harvesting wild rice consisting in, enclosing the upper portions including the fruit-bearing heads of a plurality of wild rice stalks within a substantially closed air-permeable container, permitting said heads to ripen within said container and the fruit thereof to shatter with respect to their respective stalks while within said container, and collecting said fractured fruit from the interior of said container whereby the percentage of harvest is substantially increased.

3. The method of harvesting wild rice consisting in, enclosing the upper portions including the immature fruit-bearing heads of a plurality of wild rice stalks within a substantially closed air-permeable container, retaining said immature heads within said container until they mature and ripen and the fruit thereof separates from their respective stalks, and collecting said ripened fruit from the interior of said container whereby the percentage of harvest is substantially increased.

4. The method of harvesting rice consisting in, enclosing the upper portions including the non-ripened fruit-bearing heads of a plurality of wild rice stalks within a substantially closed air-permeable container, retaining said upper portions and said heads within said closed container while the heads ripen and shatter with respect to their respective stalks, and collecting the shattered fruit from the interior of said container whereby the percentage of harvest is substantially increased.

5. The method of harvesting wild rice consisting in, enclosing the upper portions including the fruit-bearing heads of a plurality of stalks of wild rice within an inverted rain-resisting bag having air-permeable bottom portions surrounding said heads, closing the lower portions of the bag about the stalks at an elevation below the heads, retaining the heads with the container while they ripen and the fruit thereof separates from their respective stalks, and collecting the separated fruit from the interior of said container whereby a high percentage harvest yield is obtained.

6. The method of harvesting wild rice consisting in, enclosing the upper portions including the fruit-bearing heads of a plurality of wild rice stalks within an open inverted bag having air-permeable bottom portions surrounding the fruit-bearing heads, securing the portions of the bag adjacent and above its opening tightly around the rice stalks at an elevation below their fruit-bearing heads to substantially close the bag therearound, retaining said heads within the closed bag until they ripen and their fruit separates from their respective stalks and drop to the lower portions of the bag, collecting the ripened fruit from the interior of said bag whereby a high percentage harvest yield is obtained.

7. The method of harvesting wild rice consisting in, drawing together the upper portions of a plurality of wild rice stalks having fruit-bearing heads, placing an inverted bag member having aerated bottom portions in surrounding relation to the upper portions of the drawn together wild rice stalks with its aerated bottom portions surrounding the fruit-bearing heads thereof, securing portions of the bag securely about the stalks at an elevation below their heads to essentially close the bag about the heads, retaining the bag in enclosed relation about the heads while they ripen and the fruit thereof separates from their respective stalks, and collecting the ripened fruits from the interior of said container whereby a high percentage harvest yield is obtained.

8. The method of harvesting wild rice consisting in, drawing together into close proximity a plurality of wild rice stalks having fruit bearing heads thereon, placing an inverted bag having aerated bottom portions in surrounding relation to the upper portions of the gathered rice stalks and with its aerated bottom portions in surrounding relation to the heads thereof, securing the bag tightly about the stalks at an elevation below the heads thereof to essentially close the bag about the heads, maintaining the bag in enclosing relation to the heads of the wild rice stalks while they ripen and the fruit thereof separates from their respective stalks, severing the rice stalks from the ground with the bag secured therearound, and collecting the ripened fruit from the interior of the bag whereby a high percentage harvest yield is obtained.

9. The method of harvesting wild rice consisting in, gathering together into close proximity a plurality of wild rice stalks having fruit-bearing heads thereon from a relatively large area into a substantially smaller area, placing an inverted bag having an aerated bottom portion in surrounding relation to the gathered upper portions of the wild rice stalks with the aerated bottom portion of the bag surrounding the fruit-bearing heads of the rice stalks, securing the lower portions of the bag snugly about the gathered stalks of wild rice at an elevation well below the fruit-bearing heads thereof to essentially close the bag about the heads, maintaining the bag in enclosing relation to the fruit-bearing heads while they ripen and their fruit separates from their respective stalks, cutting the rice stalks at an elevation below the point of secural of the bag to the stalks in order to sever the upper portions of the stalks and the bag from the ground, and collecting the ripened fruit from the interior of the bag whereby a high percentage of harvest yield is obtained.

References Cited in the file of this patent

UNITED STATES PATENTS

| | | |
|---|---|---|
| 383,327 | Starr | May 22, 1888 |
| 1,988,886 | Wilson | Jan. 22, 1935 |
| 2,446,509 | Fischer | Aug. 3, 1948 |